Feb. 18, 1947. L. P. FRIEDER ET AL 2,415,818
BALLOON WITH PARACHUTE
Filed Dec. 4, 1945
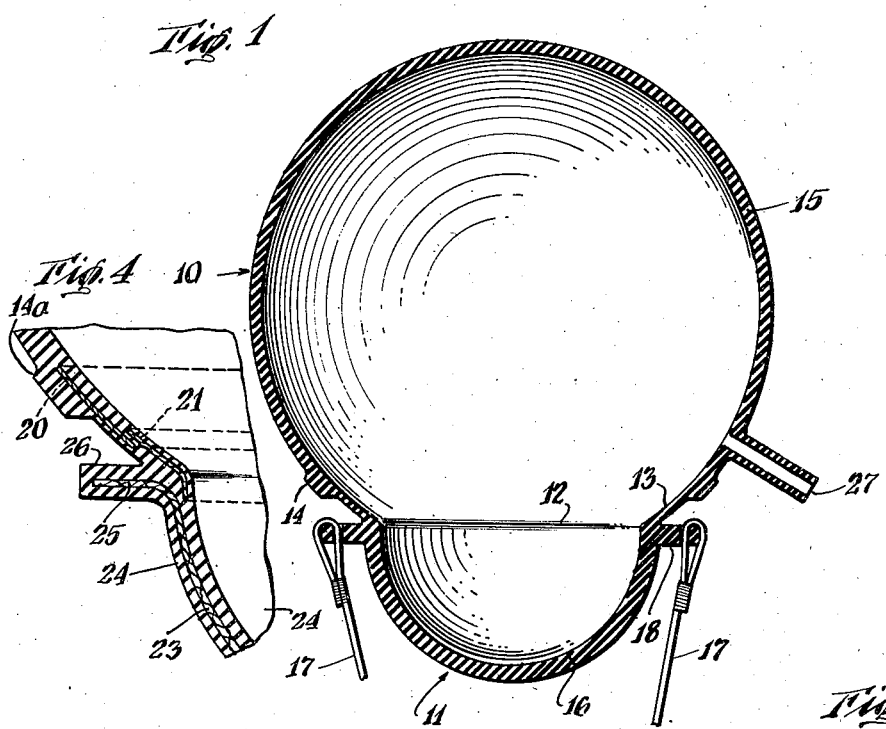
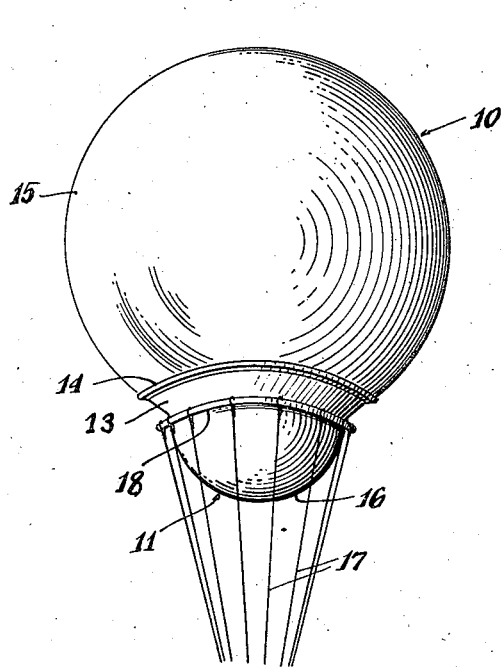
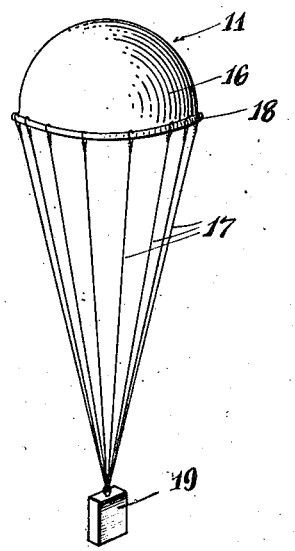
INVENTORS
Leonard P. Frieder
Walter S. Finken
BY Ernest D. Given
ATTORNEY Patented Feb. 18, 1947

2,415,818

UNITED STATES PATENT OFFICE 2,415,818

BALLOON WITH PARACHUTE

Leonard P. Frieder, Great Neck, and Walter S. Finken, Brooklyn, N. Y.; said Finken assignor to said Frieder Application December 4, 1945, Serial No. 632,664

7 Claims. (Cl. 244—32)

This invention relates to balloons. Among the objects of the invention is to provide an improved meteorological balloon which is so constructed as to embody a wall portion adapted for conversion into a parachute canopy whereby, when the balloon bursts, a case of instruments or other load attached to the balloon may be safely parachuted to the ground.

In making meteorological surveys it is common practice to attach recording instruments to parachutes suspended from the exterior of the balloons. The balloon upon ascent into higher altitudes expands in the rarefied air until it bursts. The release of the instruments from the buoyancy of the balloon causes the suspended parachute to open and retard the descent of the instruments. Quite frequently a balloon rips from base to crown and the rubber is not shattered by the explosion. When this occurs, the full weight of the balloon envelope remains attached to the descending parachute. The torn balloon envelope may foul the parachute, and, in any event, it increases the loading and the rate of descent. For recording purposes a uniform rate of descent is desirable as the recording mechanism may be synchronized with the descending speed. It is, therefore, an object of this invention to provide a load-carrying balloon which, upon bursting, will cast off a definite proportion of its weight and constitute the remainder into a parachute whose rate of descent is ascertainable.

Other objects and advantages of the invention will be set forth in the accompanying specification and claims and demonstrated by the accompanying drawing which shows by way of illustration the principle of our invention and the best mode in which we contemplate applying that principle.

Referring to the drawing:

Fig. 1 illustrates a vertical section of a balloon or balloon envelope, as molded;

Fig. 2 is a side elevation on a reduced scale of an inflated balloon carrying a load;

Fig. 3 is a side elevational view of a parachute which has been formed from the balloon after the balloon has ruptured; and Fig. 4 illustrates a modified construction for the weak circumferentially extending wall area between the upper and lower bulbous portions of the balloon, and a modification of the canopy-forming wall.

The balloon of the present invention is so formed as to provide a wall portion which is convertible into a parachute canopy. The suspension lines by which the instruments are carried aloft serve as shrouds for the canopy. The balloon is provided with a relatively weak circumferential area along which rupture takes place and which causes separation of the main or upper portion of the balloon from the canopy-forming portion. The balloon may be made from latex, by which we mean any aqueous dispersion of natural or synthetic rubber or rubber-like material.

The invention may be embodied in balloons of various forms depending upon the elevation desired to be reached, the rate of rise, and the rate of descent desired. The size and maximum diameter of a parachute is a function of its rate of descent. When a slot rate of descent is desired the lower or parachute-forming portion of the balloon is larger, i. e., it has a larger diameter than when a higher rate of descent is desired. Therefore, the upper portion of the balloon may be larger or smaller than the lower portion, or even of the same proportions, when molded. Generally speaking, the shape of the balloon will be that of intersecting spherical-like bodies.

In the drawing we have illustrated a balloon which, when filled with hydrogen or other gas at sea level pressure, has an upper portion which is larger than its lower portion.

The vertical sectional view of the balloon, as molded, is illustrated in Fig. 1 with the thicknesses of its walls exaggerated in the interest of perspicuity. The upper portion 10 of the envelope intersects the lower bulbous portion 11 in a horizontal imaginary plane 12. Intermediate the lower bulbous portion 11 and the upper bulbous portion 10, there is provided a circumferential area 13 which has a wall thickness less than the thickness of each of the walls of the lower and upper portions of the envelope. This circumferential area delineates an encircling band in the wall of the envelope through which rupture of the envelope is localized when the envelope bursts. The upper wall has molded in it as an integral part thereof a thickened ring wall 14 which assures confinement of the direction of tear within area 13 and circularly about the balloon to effect complete separation of the portion of the balloon no longer useful after rupture. This wall 14 prevents such uncontrolled ripping as might otherwise leave attached streamers.

Wall 15 of the upper bulbous portion 10 is of less thickness than the wall 16 of the lower bulbous portion so that it will have the greater extensibility. In Fig. 2 we have illustrated the general appearance of a balloon when ascending, the upper bulbous portion 10 being considerably extended as compared with the amount of extension of the lower bulbous portion 11.

The load is suspended from the balloon by means of a plurality of lines 17 which are attached at uniformly spaced distances to a flange 18 extending outwardly from the lower bulbous portion 11 at the level of its greatest girth. The flange is integral with the wall of the balloon and is located below the circumferential area of rupture 13. The balloon may be cast or molded in appropriate size and weight to provide the desired rate of rise and the particular maximum elevation at which it is desired it cease to function as a balloon. We preferably mold both of the bulbous portions as parts of spheres joined in a plane of intersection. By so doing the performance characteristics of the balloon become comparable with standard pilot and sounding balloons. Although the lower bulbous portion 11 may be shallower or even deeper, we prefer to mold it in the form of a hemisphere as such form is best suited for parachute purposes.

As the balloon ascends, its volumetric size increases and continues to expand until the balloon has reached such altitude as will cause the confined gas to rupture the envelope. Inasmuch as the envelope is expressly formed with a weak circumferential area 13 above the lower bulbous portion 11, the rupture will be initiated in and confined to this area, and the upper bulbous portion 10 will be severed from the lower bulbous portion along a substantially circumferential line. The separated upper portion deflates and falls away. With loss of lifting power, the descent of the load 19 is initiated, with the result that the wall 16 becomes reversed and assumes the function of a parachute canopy as illustrated in Fig. 3. This occurs very readily as the suspension lines are attached to the lower bulbous portion 11 at points equidistant from the horizontal center of the bulbous portion 11. Should ice have formed from condensation on the outer surface of the canopy-forming wall during ascent, the reversal of the wall will cause the ice to crack and fall free from the canopy, thus avoiding excess load on the converted parachute.

The relatively thinner wall constituting the weak area 13 is preferably located close to flange 18 so that all of the upper portion of the envelope above the flange will be detached from the canopy-forming portion when the balloon bursts. The width of the weak area 13 need be only sufficient to assure the molding of a thin-walled circumferential area. Should it be desired, the wall at either side of the weak area, that is, above and below a desired circumferential line of tear, can be reinforced with fabric or other material as shown in Fig. 4. Two separate strips of fabric 20 and 21 are there shown molded within the wall of the envelope with edges overlapping in separated planes. The line of tear will then occur between the overlapping edges of the strips of fabric as this is the weakest portion of the balloon. A balloon employing strips of fabric can be provided with a stop-tear wall 14ª, if desired.

In Fig. 4 we have also shown a modified manner of constructing the canopy-forming wall. This wall has molded therein a reinforcing material 23 which extends throughout the lower bulbous portion 24. The reinforcing material 23 may be a fabric or a flexible wire mesh of such character as to prevent appreciable extension, or, if desired, to permit only limited extension of the wall forming the lower bulbous portion of the balloon as the balloon ascends and the volume of enclosed gas increases. By thus reinforcing the wall, the lower bulbous portion will retain substantially the same dimensions when subjected to internal pressure as prevail when the balloon is molded, and will assure that any reflex occurring when the balloon bursts will not be extensive enough to entangle the suspension cords. Except for the difference in extensibility of the canopy-forming wall of the constructions shown in Figs. 1 and 4, the reinforced wall serves as a parachute canopy in the manner hereinabove described. If desired, the edge 25 of the reinforcing material 23 may be extended into the integral flange 26 to thereby strengthen the flange.

A conventional type of valve stem 27 is provided in the upper bulbous portion for enabling the balloon to be inflated and sealed when it is being readied for release.

What is claimed is:

1. A balloon comprising an envelope having an upper bulbous portion and a lower bulbous portion joined by a weaker circumferential wall portion which will rip when the envelope is distended excessively and thereby cause separation of said upper bulbous portion from said lower bulbous portion, suspension lines for suspending a load from said envelope, and means secured to the perimeter of said lower bulbous portion whereby said suspension lines are attached to said lower bulbous portion.

2. A balloon comprising an envelope having an upper bulbous portion and a lower bulbous portion joined by a weaker circumferential portion which will rip when the envelope is distended excessively and thereby cause separation of said upper bulbous portion from said lower bulbous portion, said upper bulbous portion having a wall of less thickness than the wall of said lower bulbous portion, suspension lines for suspending a load from said envelope, and means located at the perimeter of said lower bulbous portion for attaching said lines to said envelope.

3. A balloon comprising an envelope having an upper bulbous portion and a lower bulbous portion joined by a weaker circumferential portion, said upper bulbous portion having a relatively thicker wall bordering said weaker circumferential portion whereby tear originating in said weaker circumferential portion is confined to the latter portion, suspension lines for suspending a load from said envelope, and means secured to the perimeter of said lower bulbous portion whereby said suspension lines are attached to said lower bulbous portion.

4. A balloon comprising a molded rubber envelope having an upper bulbous portion and a lower bulbous portion joined by a circumferential wall whose thickness is less than the thickness of each of the walls of said upper and lower portions and a strengthened edge for said upper bulbous portion immediately adjacent said circumferential wall whereby rupture of the envelope from excessive expansion will be localized at said circumferential wall, said lower portion having a wall thickness greater than the wall thickness of said upper portion, means for suspending a load from said envelope, and means for securing said last-named means at spaced intervals adjacent the perimeter of said lower portion so that when said envelope is ruptured and said upper portion is severed from said lower portion, said lower portion will become transformed into a canopy whereby a suspended load may be parachuted to the ground.

5. A balloon comprising a molded rubber envelope having an upper bulbous portion and a lower bulbous portion joined by a circumferential wall whose thickness is less than the thickness of each of the walls of said upper and lower portions whereby rupture of the envelope from excessive extension will occur at said circumferential wall, said lower portion having less wall area than said upper portion and a wall thickness greater than the wall thickness of said upper portion, means for suspending a load from said envelope, and means for securing said last-named means at spaced intervals adjacent the perimeter of said lower portion so that when said envelope is ruptured and said upper portion is severed from said lower portion, said lower portion will become transformed into a canopy whereby a suspended load may be parachuted to the ground.

6. A balloon comprising a molded rubber envelope having an upper portion, a lower semispherical portion and a circumferential wall connecting said upper and lower portions, said circumferential wall having a thickness less than the thicknesses of each of the walls of said upper and lower portions whereby rupture of the envelope from excessive extension will occur at said circumferential wall and cause severance of said upper portion from said lower portion, said lower portion having less area than said upper portion and a wall thickness greater than the thickness of said upper portion, lines for suspending a load from said envelope, and means for securing said suspension lines to said lower portion, said means extending from the periphery of said lower portion whereby when said envelope is ruptured during flight, said lower portion reverses and forms a canopy for suspending the load attached to said suspension lines.

7. A balloon comprising a molded rubber envelope having an upper bulbous portion and a lower bulbous portion joined by a circumferentially extending wall of less strength than the wall of either the upper or lower bulbous portions, the wall of said lower bulbous portion being reinforced by material adapted to limit its extensibility when said balloon is subjected to internal pressure, and means for attaching suspension lines to the perimeter of the wall of said lower bulbous portion.

LEONARD P. FRIEDER.
WALTER S. FINKEN.